(12) United States Patent
Tegtmeier (10) Patent No.: US 6,966,597 B2
(45) Date of Patent: Nov. 22, 2005

(54) TAILGATE ASSEMBLY WITH INTEGRAL STEPS

(76) Inventor: Paul H. Tegtmeier, 5940 Cedar Point Rd., Oregon, OH (US) 43618

( * ) Notice: Subject to any disclaimer, the term of this patent is extended or adjusted under 35 U.S.C. 154(b) by 0 days.

(21) Appl. No.: 10/741,619

(22) Filed: Dec. 19, 2003

(65) Prior Publication Data

US 2004/0183326 A1    Sep. 23, 2004

Related U.S. Application Data (60) Provisional application No. 60/436,087, filed on Dec. 23, 2002.

(51) Int. Cl.$^7$ ............................................. B62D 25/00
(52) U.S. Cl. ....................................... 296/62; 296/57.1
(58) Field of Search ........................... 296/62, 57.1, 50, 296/56, 106, 146.8, 61; 280/166; 182/77

(56) References Cited

U.S. PATENT DOCUMENTS

| | | | | |
|---|---|---|---|---|
| 578,332 A | * | 3/1897 | Heaton ............................. 296/62 |
| 688,448 A | * | 12/1901 | Thompson ........................ 296/62 |
| 1,181,367 A | * | 5/1916 | Bourgon .......................... 296/62 |
| 1,223,639 A | * | 4/1917 | Swartsel ......................... 296/62 |
| 2,333,849 A | * | 11/1943 | Driscoll ......................... 296/62 |
| 2,850,187 A | * | 9/1958 | Roberts ......................... 296/57.1 |
| 3,462,170 A | | 8/1969 | Smith et al. ................... 280/166 |
| 3,539,033 A | * | 11/1970 | Schwarz et al. ................ 182/77 |
| 3,606,382 A | * | 9/1971 | Pollock .......................... 296/62 |
| 3,645,557 A | * | 2/1972 | Aldropp et al. ................ 280/166 |
| 3,853,369 A | * | 12/1974 | Holden ........................... 296/62 |
| 3,889,997 A | * | 6/1975 | Schoneck ........................ 296/62 |
| 4,527,941 A | * | 7/1985 | Archer ........................... 296/61 |
| 5,312,150 A | * | 5/1994 | Quam ............................. 296/62 |
| 5,513,866 A | | 5/1996 | Sisson ........................... 280/166 |
| 5,549,312 A | | 8/1996 | Garvert ......................... 280/166 |
| 5,617,930 A | | 4/1997 | Elia ............................. 182/97 |
| 5,673,960 A | * | 10/1997 | Sorensen ....................... 296/57.1 |
| 5,788,311 A | * | 8/1998 | Tibbals ......................... 296/62 |
| 5,803,475 A | * | 9/1998 | Dick ............................. 296/62 |
| 5,816,638 A | | 10/1998 | Pool ............................. 296/26.11 |
| 5,897,125 A | | 4/1999 | Bundy ........................... 280/166 |
| 5,941,342 A | | 8/1999 | Lee ............................. 182/95 |
| 6,237,927 B1 | | 5/2001 | Debo ............................ 280/166 |
| 6,460,915 B1 | | 10/2002 | Bedi et al. .................... 296/183 |

* cited by examiner

*Primary Examiner*—Kiran B. Patel
(74) *Attorney, Agent, or Firm*—John H. Miller (57) ABSTRACT

A tailgate or side-gate for a vehicle, including a pickup truck, is disclosed that, when lowered, forms at least one step that is lower than the bed or floor of the vehicle. A more preferred embodiment forms at least two steps at different levels so that one may easily walk into the box with both arms full. When raised the exterior of the tailgate can have an appearance like the exterior of an original equipment tailgate. A mechanism for automatically lowering and raising the tailgate or side-gate is also disclosed along with several other functional options.

25 Claims, 8 Drawing Sheets

TAILGATE ASSEMBLY WITH INTEGRAL STEPS

The present invention includes an embodiment like a tailgate assembly for trucks, cars and other vehicles and the method of making the assembly. The assembly includes one or more integral steps when the tailgate assembly is lowered to make entry into or onto the bed of the vehicle easy and convenient. This is a continuation-in-part of provisional application Ser. No. 60/436,087 filed Dec. 23, 2002.

BACKGROUND

Numerous means for making it easier to enter the bed of a vehicle like a truck such as a pickup truck are known. For example, U.S. Pat. Nos. 3,462,170, 5,549,312, 5,617,930 and 5,941,342 disclose folding staircases or ladders for fastening to the tailgate of a truck and U.S. Pat. No. 5,816,638 discloses a bed extender for a box of a pickup that includes a second tailgate that has a folding step. U.S. Pat. No. 6,460,915 discloses a side panel for a pickup having integral steps, but this entry position interferes with the position of choice for large tool boxes, is very expensive and adds additional joint lines to the exterior of the pickup box.

None of the above disclosed devices meet the long felt needs of one or more convenient and stable steps onto the bed of a truck, good aesthetics both inside and outside the box as required of today's pickup trucks and low cost. Also, most of these devices intrude into the carrying space of the pickup box, or stick out from the back of the tailgate, both being undesirable. What is needed are steps into a pickup truck or other vehicle or structure that are integral in the tailgate, easy to use and that do not significantly interfere with the aesthetics of the tailgate and vehicle.

SUMMARY OF THE INVENTION

The present invention includes a door/step assembly for a vehicle having a bed or a floor. The door/step assembly is preferably a tailgate assembly, but can be located on the side of the vehicle instead of on the tail end as will readily be understood by the following disclosure. A tailgate assembly will be used to describe the invention. The tailgate assembly pivots to open or close, the pivot location being several inches below the top surface of the bed and normally below the bottom of the bed. The tailgate assembly, when lowered, provides one or more steps to enable a person to step onto the bed.

The present invention includes a tailgate assembly for a pickup truck or any type of truck or car having a cargo bed in which the tailgate assembly contains one or more steps integral with and substantially or totally within the tailgate and which form as the tailgate is lowered. Preferably the interior of the tailgate acts as the tops of one or more steps, i.e. the surface one steps on to walk up into the bed of the pickup. The exterior of the tailgate can appear the same or essentially the same as the original equipment tailgate or can be of a different material. The interior of the tailgate can have very similar appearance to the original equipment tailgate except for one or more horizontal lines or joints separating the steps in the preferred embodiments. Also, the material exposed on the interior of the tailgate can be selected to be more suitable for stepping on than the metal of the original equipment tailgate.

The lower portion of the tailgate pivotly mounts on each side of the tailgate onto the rear of the vehicle with mounts or brackets that fasten to either the frame or to the bed of the vehicle, in either case the pivoting mounts of the tailgate are located substantially below the top of the bed of the vehicle. By substantially below is meant at least a few to several inches below, such as at least 2 inches and as much as about 8 to about 15 inches below, such that the interior of at least the lower portion of the tailgate, when the tailgate is lowered, is at an elevation that one can step from that portion of the tailgate to the top of the bed, preferably with ease. This feature permits the tailgate to act, when lowered, as a single step into the bed, but preferably acts as two or more steps into the bed. It is possible that on some vehicles the mounts or brackets will be a part of the original vehicle or a part of a hitch in which cases the tailgate can pivot on one of those parts. It is also possible to make the mounts or brackets disclosed in a single piece instead of two pieces.

The tailgate assembly of the present invention preferably includes arms and preferably two sets of arms with pivoting members or links connecting the sets of pivoting arms. Preferably the arms and the pivoting members, links, are totally or substantially concealed inside the tailgate when the tailgate assembly is in the up or closed position. Preferably, in the closed position, the rear of the pickup having the tailgate of the present invention looks the same as the rear of the pickup having the original equipment tailgate, and the interior face of the tailgate of the present invention differs in appearance only with a line or joint running across the interior face parallel with the bottom of the bed of the pickup. Though not desirable, it is permissible that one or more parts do extend beyond the original confines of the tailgate, particularly the interior face of the tailgate, i.e. the face forming the rear of the box of the vehicle.

In one preferred embodiment of the invention, tailgate assembly of the present invention further comprises one or more locking members and a lock release mechanism for locking the top part of the tailgate assembly, the lower step, to the lower part of the tailgate assembly, the upper step, so that when the tailgate assembly is lowered it remains unseparated to present a conventional level tailgate surface. By activating the lock release mechanism, either before lowering the tailgate or after the tailgate is lowered, the tailgate assembly separates forming steps. The present invention includes two options of this embodiment. With the first option, when the tailgate assembly is lowered with the locking members in a locked position, the interior face of tailgate becomes the upper surface of the lowered tailgate and this upper surface is at a lower elevation than the bed of the pickup.

In any of the embodiments of the present invention, the tailgate assembly can contain various means for securing and/or locking the tailgate assembly in the closed position, but preferably the tailgate assembly includes a conventional locking and release mechanism with the release handle being preferably exposed on the exterior or rear surface of the tailgate assembly or on the interior or step surface of the tailgate assembly.

The present invention also includes a tailgate assembly having an optional mechanism for lowering and raising the tailgate with a mechanical mechanism or with one or more fluid cylinders, preferably hydraulic. Another option-especially useful with the option just described is a means for locking the tailgate in the up position, such as one or more solenoids, door type latches, or equivalents, any of which can be activated from the cab or back part of the box with a switch or remotely with a remote activator, like the remote control and key-holder used to lock and unlock the doors and trunk lid on automobiles and trucks today. Another option includes electro-mechanical means for locking the upper portion and the lower portion of the tailgate or sidegate together when the tailgate or sidegate is lowered such that the top surfaces of the two portions are generally in the same plane, this means, upon activation, unlocks the two portions allowing the top portion to move away from the bottom portion to form a lower step. The electro-mechanical locking means is preferably located at least partially inside at least one of the tailgate or sidegate portions.

The present invention also includes the method of making a tailgate assembly for a vehicle in which concealed within the tailgate assembly are arms and pivoting members which allow the tailgate assembly to form steps into the pickup bed when the tailgate assembly is lowered. The method of the present invention includes additional steps necessary to make any of the tailgate assemblies and options of the present invention.

BRIEF DESCRIPTION OF THE DRAWINGS

FIG. 5b is an side view of the upper section of the tailgate assembly shown in FIG. 5a.

FIG. 7 is a perspective view of one of the two mounting brackets of a preferred embodiment tailgate assembly of the present invention.

FIG. 8a is a plan view of one of the preferred links used in the present invention.

FIG. 8b is a side view of the link shown in FIG. 8a.

FIG. 9a is a side view of a preferred bracket that can be used in the present invention to mount a rear bumper to the tailgate assembly of the present invention.

FIG. 9b is a front view of the bracket of FIG. 9a.

FIG. 9c is a plan view of the bracket of FIGS. 9a and 9b.

FIG. 10 is a plan view showing how one preferred embodiment of the tailgate assembly of the present invention attaches to the frame of a pickup truck and showing other optional elements of a preferred embodiment of the tailgate assembly of the present invention.

DETAILED DESCRIPTION OF PREFERRED EMBODIMENTS

Figures 7, 8A, 8B, 9A, 9B, 9C, 10:
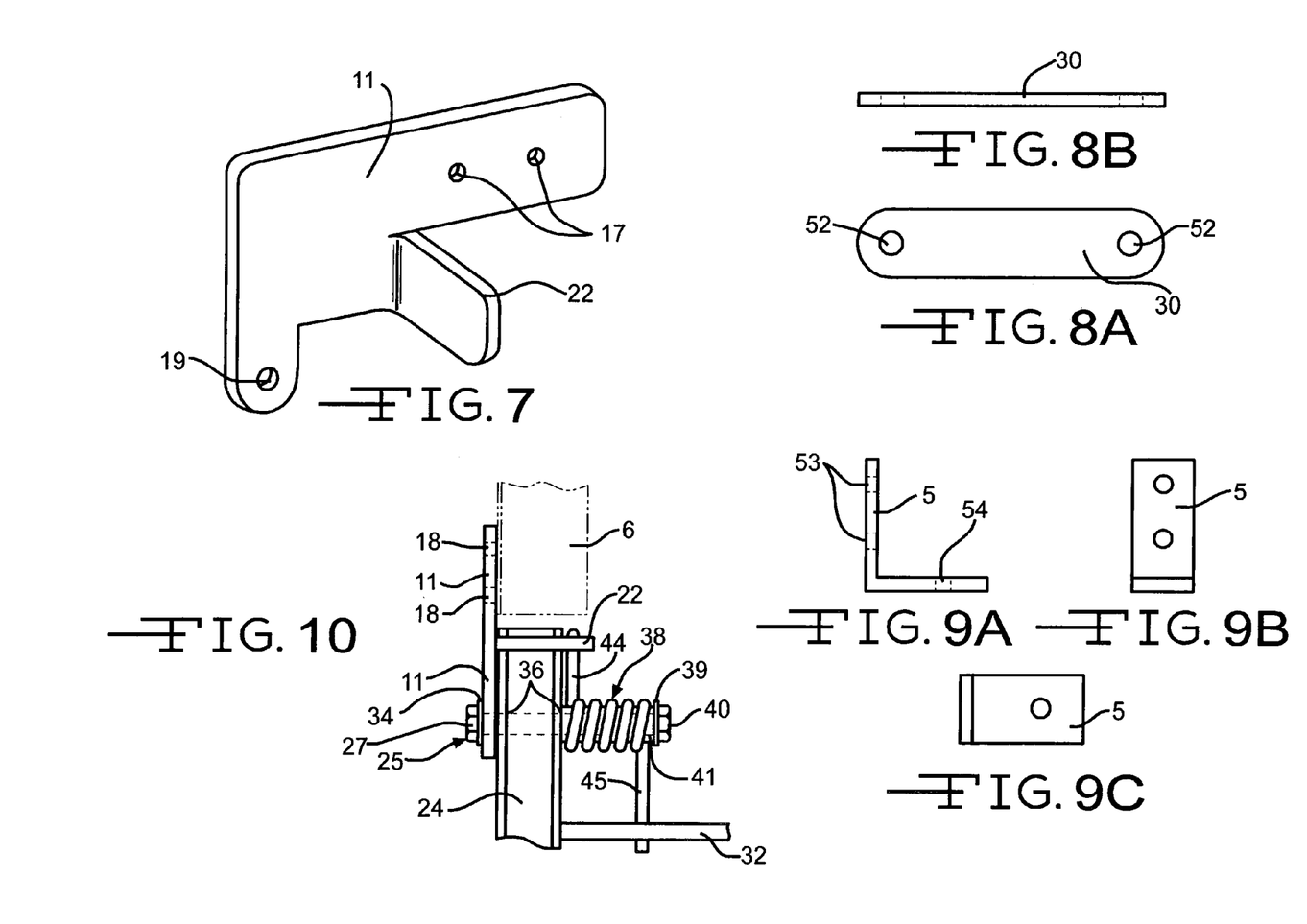

FIGS. 1–4 show a portion of a vehicle 1, such as a portion of a pickup truck, in phantom, having a box 2 in the rear portion of the vehicle 1 and a conventional rear bumper 4 and a conventional bumper bracket 5, shown in detail in FIGS. 9a, 9b and 9c, that holds the bumper 4 in place. The side of 5 having two holes preferably mounts to the bumper 4 and the side with one hole mounts to an upper arm 24 that will be described later. Wheel wells 21 would be present in many pickup boxes. A conventional frame 6 supports the box 2 and the bumper bracket 5 and the bumper 4. The box 2 usually has a horizontal floor 3 of a bed 42 and a vertical side 7 on each side of the bed 3. The bed 42 forms the bottom of the box 2.

A tailgate assembly 8 of the present invention is preferably supported by the frame 6 with a pair of brackets 11 which are attached by any known manner, such as bolts, to a rear portion of the frame 6. A bracket 11 is shown in more detail in FIG. 7. Two brackets 11 are shown in FIGS. 1–4 as being attached to the vehicle frame 6 with rivets or bolts 18 that pass through holes 17 in each tailgate bracket 11. The tailgate assembly 8 then attaches to one of the tailgate brackets 11 on each lower side of the tailgate assembly 8 with a bolt or pin 20 pivotly mounted in a tailgate support hole 19. The tailgate support hole 19 is located in the tailgate bracket 11 such that when the tailgate bracket 11 is attached to the vehicle frame 6, the tailgate support hole 19 is located several inches below the top of the bed, such as about 10 inches. The bumper 4 is removed in FIG. 2 to better show the tailgate assembly 8 since the bumper 4 is an optional element.

Figure 11:
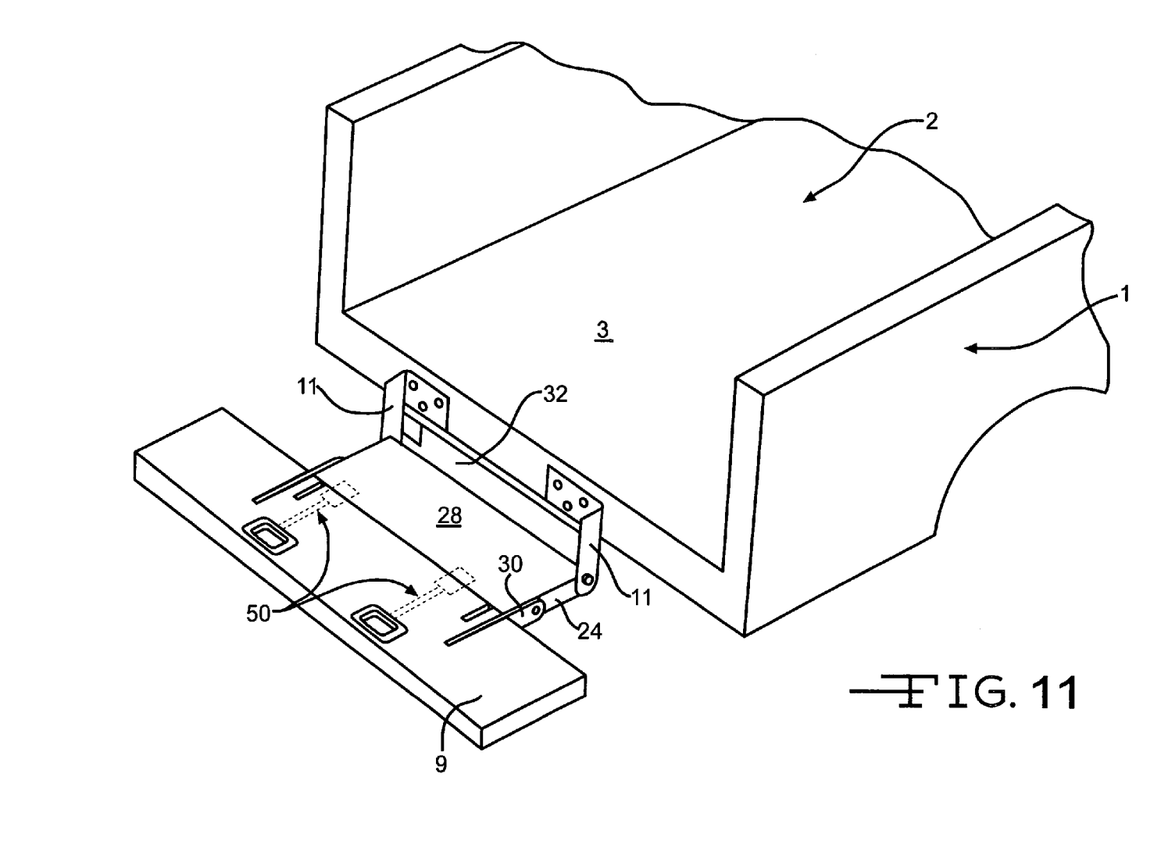
FIG. 11 is a perspective drawing showing another preferred embodiment of a portion of a tailgate assembly of the present invention having locks therein or thereon for releasably locking portions of the tailgate assembly together.

Each tailgate bracket 11, as shown in detail in FIG. 7, also has an ear 22 that extends perpendicularly from an inner face of each tailgate bracket 11, i.e. when the tailgate brackets 11 are mounted on the vehicle frame 6, each ear 22 extends towards the opposite bracket 11 and its ear 22. Preferably the ears are about 2.5 inches long and are formed by cutting a slit in the bracket below the mounting holes 17 and then bending the ear 22 until the large faces of the ear 22 are perpendicular to the face of the bracket. The purpose of the ear 22 will be explained later. The tailgate bracket can be modified to attach to the rear of the bed 3 instead of the vehicle frame, as shown in FIG. 11.

The tailgate assembly 8 comprises a top portion 9 and a lower portion 10, but from the rear, with the tailgate assembly 8 in the up position, no joint exists in a rear cover 16 of the tailgate assembly 8. A joint 23 shows in the interior side of the tailgate assembly 8 that can be seen in FIG. 1 where the rear cover 16 has been cut away to expose a portion of the interior of the tailgate assembly 8—the extension of this joint in the remainder of the width of the tailgate assembly 8 should be in double dashed lines, parallel and close together. Thus, from the rear the tailgate assembly 8 can actually be, or appear to be, a conventional original equipment tailgate.

Figure 3:
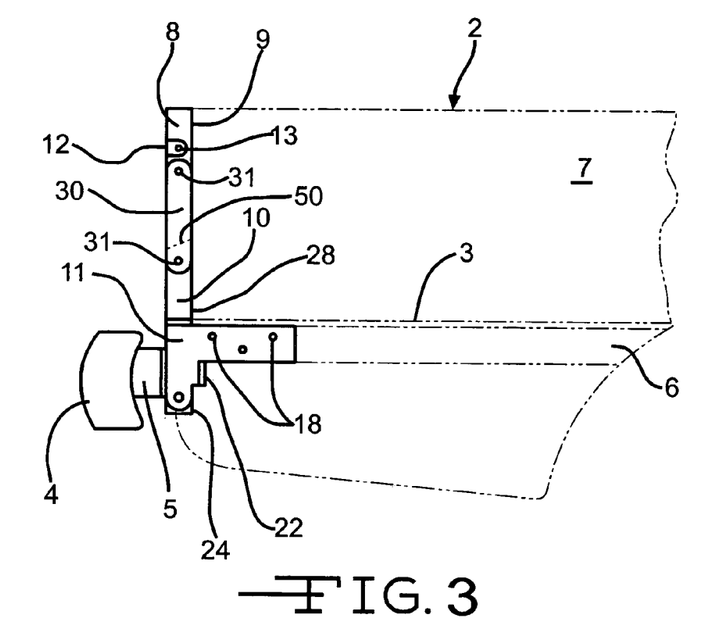
FIG. 3 is a side view of a rear portion of the vehicle (in phantom) having a tailgate assembly of the present invention with a portion of the nearest sidewall of the box removed to better observe the tailgate assembly.
Figure 4:
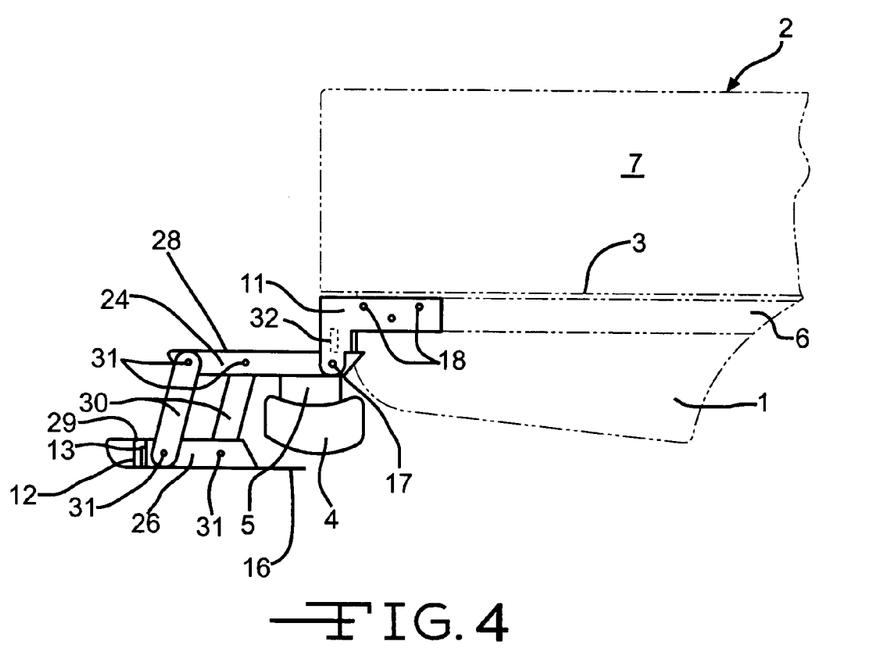
FIG. 4 is a cross section view of the same vehicle (in phantom) shown in FIGS. 1–3 taken along lines 4—4 of FIG. 1 with the tailgate assembly lowered to form two steps for entering the box or bed of the vehicle.

The tailgate assembly 8 further comprise two or more upper arms 24 and two or more lower arms 26. The upper arms 24 are spaced apart and are pivotly attached near one end to the bolt or pin 20 and are also attached to a hidden surface of a lower interior cover 28 of the lower portion 10 by any suitable manner, such as welding. The exposed surface of the lower interior cover 28 becomes the top surface of a top step when the tailgate assembly 8 is lowered as shown in FIG. 4, and part of the exposed interior surface of the box 2 when the tailgate assembly 8 is in the up or closed position as shown in FIG. 3. As shown in FIG. 6c, the lower interior cover 28 optionally, but preferably, has a stop or toe plate 32 at one long edge of the cover 28 that is perpendicular to the exposed step surface of the cover 28 to provide rigidity and a stop for keeping one's foot from advancing under the bottom of the bed 3 when walking up the steps onto the bed 3. Also, preferably, the stop plate 32 has a bent over portion 33 that is generally parallel to said cover 28 to provide additional rigidity. The lower interior cover 28, optional stop plate 32 and optional bent over portion of 32, numbered 33, can be made from a single piece of sheet by bending on a brake, or can be assembled from two or more pieces by welding, bolting or riveting or equivalent joining means. Optional extensions of the stop plate 46 can be added if desired, but are not essential. Those elements outside the upper arms 24 are shown in phantom because they are optional. It is preferable, but not necessary, that the lower interior cover 28 (top of top step) extend the full width of the tailgate 8. Front covers 48 of the upper step and 49 of the lower step are not installed on the tailgate assembly in FIG. 2 and other figures to enable showing of the internal arms 24, 26 and the attachment ends of the links 30. The front covers 48, 49 can be integral with step covers 28, 29 respectively or they can be welded on or bolted on separate pieces.

Each lower arm 26 is attached to one of the upper arms 24 with two spaced apart links 30. The four links 30 are each preferably about 10 inches long and are preferably spaced apart about 5 inches, but these dimensions can vary with the size of the tailgate assembly 8 and personal choice. Each of two of the links 30 is mounted at one end to a side surface of an upper arm 24 in a pivoting manner in any suitable manner such as with a bolt or pin 31. Each of links is pivotly mounted near an opposite end to a side surface of a lower arm 26 in the same or similar manner, such as with the pin or bolt 31. The four links 30 can also be referred to as a right front link, a right rear link, a left front link and a left rear link. It is also envisioned that links, serving the same function 30, can be pivotly mounted inside the arms 24 and 26, can be mounted adjacent the inside surfaces of the arms 24 and 26 or a combination of being mounted inside and on an inner or outer surface of arms 24 and 26.

The end of the upper arm 24 opposite the end mounted to the rod or bolt 20 is preferably angled at about 45 degrees with a top surface of the upper arm 24 being longer than its lower surface. Likewise, the end of the lower arm 26 closest to the angled end of the upper arm 24 is also angled in a way to fit against the angled end of upper arm 24 to form joint 50 when the tailgate assembly 8 is in the closed position shown in FIG. 3. In FIG. 3 the closest side 7 of the box 2 and any optional end cap has been removed to show an outer link 30, the tailgate latch assembly 12 and a rod 13. The lower arms 26 are also attached to a hidden surface of an upper interior cover 29 of the upper portion 9 by any suitable manner, such as welding. The exposed surface of the upper interior cover 29 becomes the top surface of a lower step when the tailgate assembly 8 is lowered as shown in FIG. 4, and part of the exposed interior surface of the box 2 when the tailgate assembly 8 is in the up or closed position as shown in FIG. 3.

The lower arms 26 are also attached to a hidden surface of the rear cover 16 which covers the entire exposed, exterior side of the tailgate assembly 8 when it is in the closed position, and preferably also bends over and can be welded to an upper edge of the upper interior cover 29 to cover the top of the tailgate assembly 8. The rear cover 16 can be made and painted to look just like the rear of an original equipment tailgate and can be made from an original equipment tailgate if available. Optionally, the rear cover 16 and the upper interior cover 29 can be a single piece and made from painted steel painted or unpainted aluminum, stainless steel toe plate or other textured or non-textured material. The shape of the rear cover 16 can be of any desired shape such as curved, angled, straight, bowed, etc. and dimpled, embossed, plain, and painted or unpainted as desired for esthetic affect. Preferably it is shaped to match the ends of the sides 7 of the box 2.

Figure 5A:
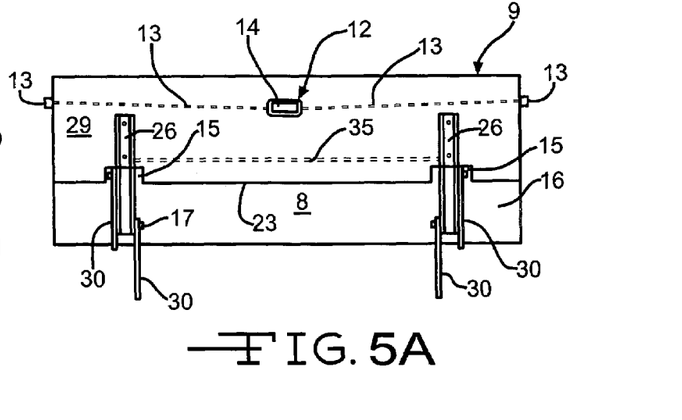
FIG. 5a is a view of an upper section of the tailgate assembly, shown in FIGS. 1–4, as seen from inside the box. This upper section preferably becomes a lower step when the tailgate assembly is lowered.
Figure 5B:
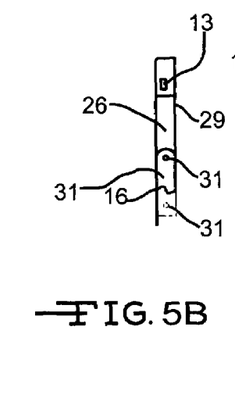

As shown in FIG. 5a, which is a plan view of the top portion 9 of the tailgate assembly 8 in a lowered position, optionally, but preferably, also has a stabilizing member 35 running between and optionally attached to each of the lower arms 26. The stabilizing member 35 can be a rod, angle, box tubing, pipe, or any equivalent structural shape that can be attached in any known rigid manner to the lower arms 26 or the lower surface of the upper interior cover 29, or to both. The stabilizing member 35 can act to support the upper interior cover 29 and/or to keep the lower arms a desired distance apart when the tailgate assembly 8 is raised and lowered and when the tailgate assembly 8 is stressed by substantial weight in the lowered position. The cut out portions of the upper interior cover 29 forming slots 15 allow the outer links 30 move to the position shown in FIG. 4.

Figure 6A:
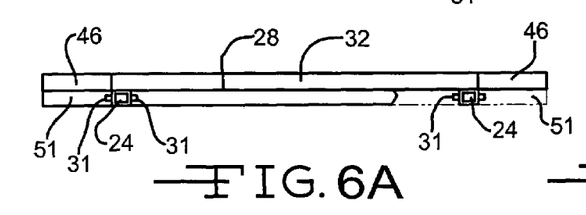
FIG. 6a is a rear view of a lower section of the tailgate assembly shown in FIGS. 1–4 that preferably becomes an upper step when the tailgate assembly is lowered.
Figure 6B:
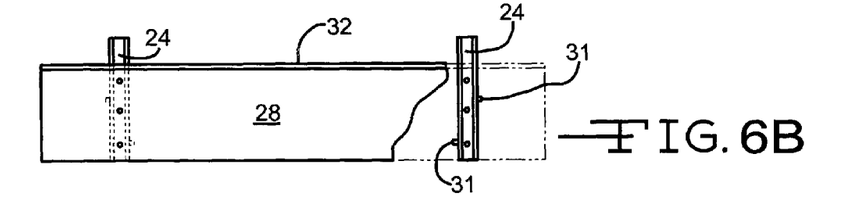
FIG. 6b is a plan view of the lower section shown in FIG. 6a with a portion of the interior face cut away to show interior structural elements.
Figure 6C:
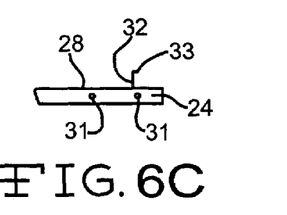
FIG. 6c is a side view of the lower section shown in FIGS. 6a and 6b.

FIG. 6a, 6b, and 6c are different views of the lower portion 10 of the tailgate assembly 8 that becomes the top step when the tailgate is lowered. Note that FIG. 6c, an end view, shows the optional bent over portion 33 of the stop plate 32. The end view 6c is shown without an optional end cap that can be used to hide the internal structural elements of the arms 24, the pins 31 and links 30 if desired.

The bumper mounts 5 are attached to either the upper arms 24 or to a beam attached to and spanning the upper arms 24. This allows the bumper 4 to swing out of the way of the upper arms 24 as the tailgate assembly 8 is lowered to provide steps.

The tailgate assembly 8 is locked in the upper position with a conventional tailgate latch assembly 12 such as that used as original equipment on a conventional original equipment tailgate. The latch assembly 12 usually comprises a recessed release handle 14 shown here in the rear cover 16, a lever assembly (not shown) and two rods 13, the ends of which enter conventional openings or cylinders in the inside of the upper portion of each top-rear portion of each side 7 of the box 2 in a conventional manner. Any conventional latch assembly for holding a tailgate in the up position can be used in the tailgate assembly 8 of the present invention. The release handle 14 can be located, and recessed if desired, in other locations such as in the interior face of the tailgate 8 (FIG. 5a), but that is not as desirable since it would be on the stepping surface of a step as will be seen. The location and type of latch means for holding the tailgate assembly 8 in the up or closed position is not critical to the present invention.

FIG. 10 shows a preferred manner in which the tailgate assembly 8 is supported on the mounting brackets 11 and the purpose of the ear or tab 22 on the tailgate mounting bracket 11. Holes 36 exist opposite each other in the sides of each upper arm 24 a few inches from the ends nearest the frame 6 of the vehicle 1. A bolt or bushing 25, preferably having a diameter of about 0.625 inch having a head 27 of larger diameter is passed through an optional washer 34, the tailgate support hole 19, a second optional washer 37, then through the holes 36 in the upper arm 24, then optionally, but preferably, through a bushing 41 around which is a torsion spring 38, and then through an optional third washer 39 and finally into a nut 40. If desired a cotter pin can be used in place of the nut 40 and a lock washer can be used of in place of or in addition to the third washer 39. The ear or tab 22 serves as a stop for the top of an end portion of the upper arm 24 to prevent the tailgate assembly from lowering below the desired position.

The optional torque spring 38 has a coiled portion 43 with extensions 44 and 45 at opposite ends of the coiled portion 43. The extension 44 is a continuation of the rod forming the coiled portion 43 rests against the bottom side of the ear 22. Thus, an optional second function of the ear 22 is to enable the function of the torque spring 38. The extension 45 at the opposite end of the coiled portion 43 from extension 44, which is a continuation of rod forming the coiled portion 43, rests against either a bottom surface of the lower interior cover 28 or stop plate 32.

The optional torque spring 38 acts to lower the tailgate assembly 8 in a slower or easier manner and assist the closing of the tailgate assembly. The tailgate assembly 8 can function in the same manner without the optional torque spring 23, but requires more force from the person lowering and raising the tailgate assembly 8. Many known torque springs and equivalents can be used in the present invention. One preferred combination to use with the 0.625 diameter bolt 25 is a bushing 41 having an outside diameter of about 1 inch with a torque spring made by winding a 5/16 inch spring steel rod around a mandrel of 1.066 inch diameter. The torque spring 38 is made and installed such that when the tailgate assembly 8 is in the closed position, the torque spring 38 is slightly stressed and becomes more stressed as the tailgate assembly 8 is lowered, but not so stressed that the tailgate assembly will not stay in the lowered position with only its own weight. Other types of biasing devices can be used to perform the function of the torque spring 38 as will be obvious to the artisan and such are considered to be a part of the present invention.

Often, it is desirable to have a tailgate that presents a flat surface in a single plane when lowered so the top surface can be used as a table, work bench, etc. A more preferred embodiment allows the tailgate assembly of the present invention to provide this function when desired and also to lower as steps, or to lower further as steps, when desired.

Another preferred embodiment of the invention is shown in FIG. 11. This embodiment can be exactly like the embodiment shown in FIGS. 1–10 and as described above except for one or more releasable locking mechanisms 55 for locking a top portion 56 of this tailgate embodiment of the present invention to a lower portion 57. This embodiment is for those who, at times, want to have the top of the lowered tailgate in a single plane, such as for tailgate parties, sitting, etc. In the embodiment shown in FIG. 11 one or more, preferably two, locking mechanisms 55 that function to lock and unlock the top portion 56 of the tailgate assembly to the bottom portion 57. Each locking mechanism 55 can comprise a handle 59, preferably recessed within the top portion 56 of the tailgate. Each handle 59 is attached to a movable locking member 60, such as a solid or hollow movable member of any suitable cross section such as round pipe or rod, square bar or channel, etc. Aligned with the movable locking member 60, but mounted or fixed in the top of the bottom portion 57 and adjacent the edge of the upper portion 56 where the movable locking member 60 passes through an opening is a hollow receiver 62 into which the movable locking member 60 can enter to lock the upper portion 56 to the lower portion 57 of the tailgate. For example, the hollow receiver 62 can be a two inch square tubing having an inside dimension of about one and one-half inches square and the movable locking member 60 can be a one and one-half inch square rod or box channel. The movable locking member 60 should be of a length and be able to move far enough to enter the hollow receiver 62 a distance of at least two inches and preferably at least three inches. Optionally, the movable locking member 60 is surrounded by a coil spring 61 to bias the locking member in a locking position for safety.

To use the embodiment shown in FIG. 11, the operator releases the tailgate latch 12 (FIG. 1) and lowers the tailgate. The releasable locking mechanism(s) 55 will be in a locked position and as the tailgate is lowered to a horizontal position it will remain as a single unit providing a flat surface like an original equipment tailgate, although at a lower level than the original equipment tailgate. This flat tailgate of the present invention, in the lowered position, can be used as a single step into bed 3 of the box 2 since it is at a lower elevation than an original tailgate because its pivot point at rod or bolts 20 are several inches below the level of the bed 3.

Figure 1:
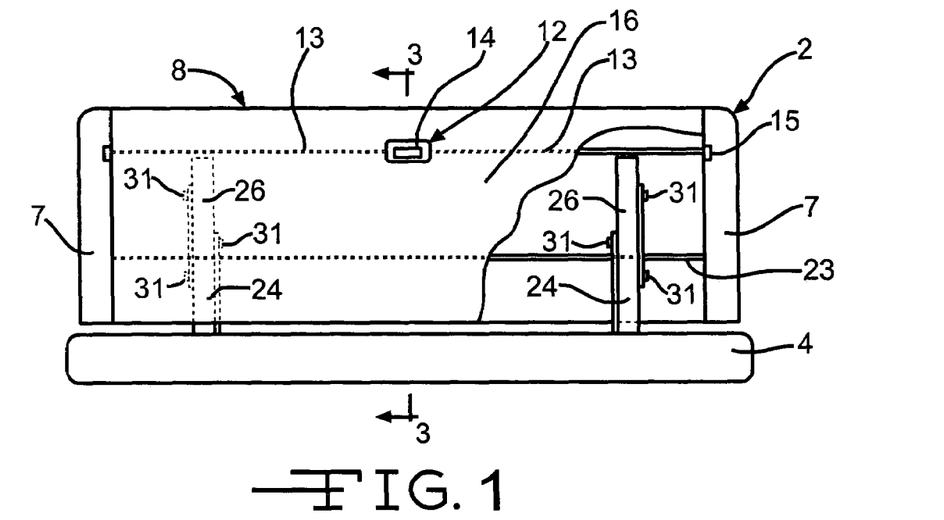
FIG. 1 is a rear view of a portion of a vehicle having a tailgate assembly of the present invention with some of components of the vehicle shown in phantom and a portion of the tailgate assembly cut away to reveal components of the tailgate assembly.
Figure 2:
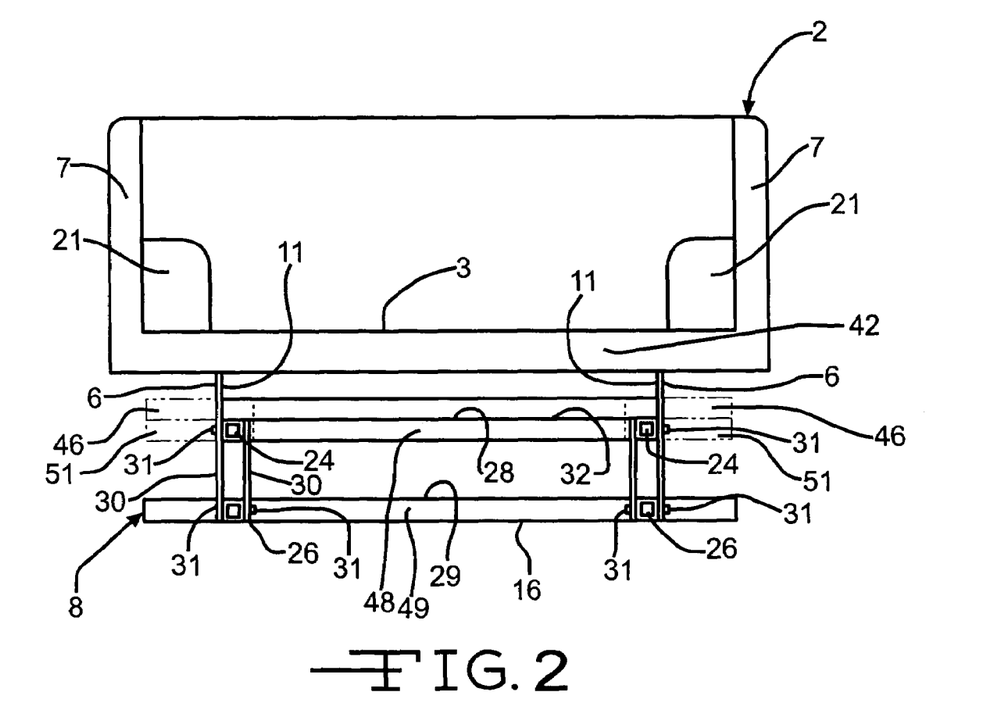
FIG. 2 is a rear view of the same vehicle with the vehicle shown in phantom and with the tailgate assembly of the present invention lowered forming two steps for entering the box or bed of the vehicle.

If the operator then desires to convert this embodiment of the present invention tailgate into two or more steps, the operator pulls on the handle(s) 59 to withdraw the movable locking members 60 at which time the upper portion 56 can be dropped down to form a lower step as shown in FIGS. 2 and 4. If the operator desires at the outset to have two or more steps leading into the bed 3 with this embodiment, after releasing the tailgate latch 12 and starting to lower the tailgate assembly 48 the movable locking member(s) 60 are retracted from the hollow receiver(s) 61 by pulling the handle(s) 59 and holding this retraction during lowering of the tailgate until the upper portion 56 is fully separated from the lower portion 57.

When raising this tailgate embodiment, the operator would again retract the movable locking member(s) 60 and raise the lower step, the lower portion 56, until the upper portion 57 is aligned with the lower portion 56 at which time the movable locking member(s) 60 would be inserted into the hollow receiver(s) 62 by releasing the handle(s) 59 or moving the handle(s) 59 to effect the insertion. At that point the operator can raise and close this embodiment of the tailgate of the present invention in the normal manner.

The locking mechanisms 55 used in the embodiment described above can be replaced with any of a plurality of releasable locking mechanisms located along any part of the joint between the top portion 56 and the lower portion 57. For example, sliding bolt locks like used on doors, hooks and eyes like used on doors, gates, etc., buckles like used on ski boots, etc. (heavier duty though), and any fastener or locking mechanism that will hold the two portions together and that can be released to let them separate can be used. The locking mechanisms, if located on the surface of the tailgate assembly of the present invention, or on the sides, should preferably be on or close to that outside surface that faces the box when the tailgate of the present invention is closed, such as shown in FIG. 11.

Figure 12:
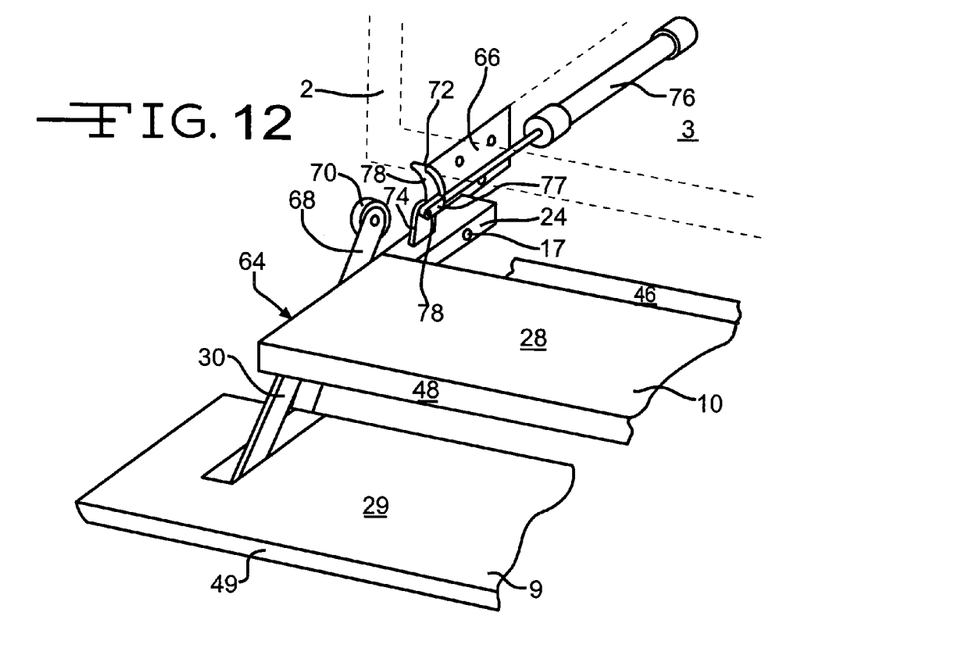
FIG. 12 is a partial perspective view of a left side portion of a different embodiment of the tailgate assembly of the present invention, further showing an optional hydraulic cylinder for lowering and raising the tailgate assembly.

FIG. 12 is a partial perspective view, showing the left hand side, of a powered tailgate assembly 64 that can be lowered and raised with by one or two fluid cylinders 76. This embodiment is very similar to the embodiment shown in FIGS. 1–4 and described above. The differences include a modified tailgate bracket 66 (see FIG. 15), long inboard links 68, a cam follower 70 rotatatably mounted near the extended end of each of the long inboard links 68, a cam 72 mounted on each of the tailgate brackets 66, a lever arm 74 attached to a top surface of each of the upper arms 24 near an inboard end of each arm 24 and one or more double acting fluid cylinders 76 with the end of the cylinder rod 77 attached to the top portion of the lever arm 74 with a pin or bolt 78 in rotatable and known manner. The fluid cylinder 76 can be mounted to the vehicle in any suitable manner, such as to the frame 6 with an arm attached to the cylinder 76, the arm 79 having a hole near the end to receive a pin or bolt 80 attached to the frame 6, the arm 79 being free to rotate on the pin or bolt 80 to allow the cylinder 76 to change orientation if necessary during the raising and lowering operations. The right hand side of the powered tailgate assembly 64 preferably is a mirror image of the left hand side shown in FIG. 12, but it is possible to raise and lower the powered tailgate with only one fluid cylinder. Fluid such as air, hydraulic fluid, oil, etc. is supplied to the double acting cylinder 76 in a known manner such as from a compressed air tank hooked to an air compressor or a hydraulic pump, the latter being either the power steering pump or preferably an electrically driven separate pump that is preferably operable even when the vehicle's engine is not running. While air is a possible fluid, a non-compressible fluid is preferred for steady and uniform performance of the raising and lowering operations. An example of a suitable fluid cylinder mechanism for use in the invention is a Manual 4-Way Power Unit #42338 connected to a #5PN98 (two piece) Double Acting Cylinder, both available from Grainger.

Figure 13:
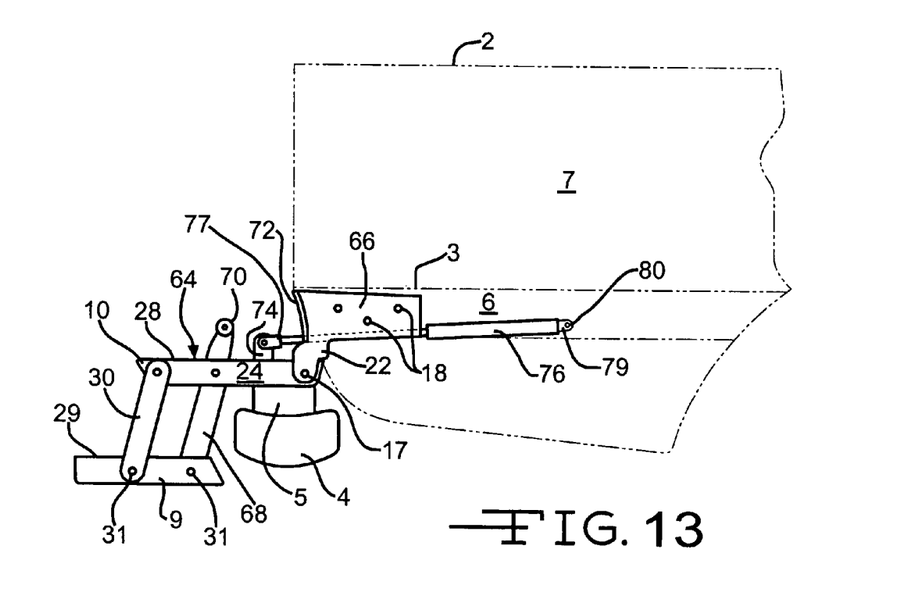
FIG. 13 is a partial side view of a portion of a pickup truck (in phantom) having the embodiment shown in FIG. 12 mounted thereon.
Figure 14:
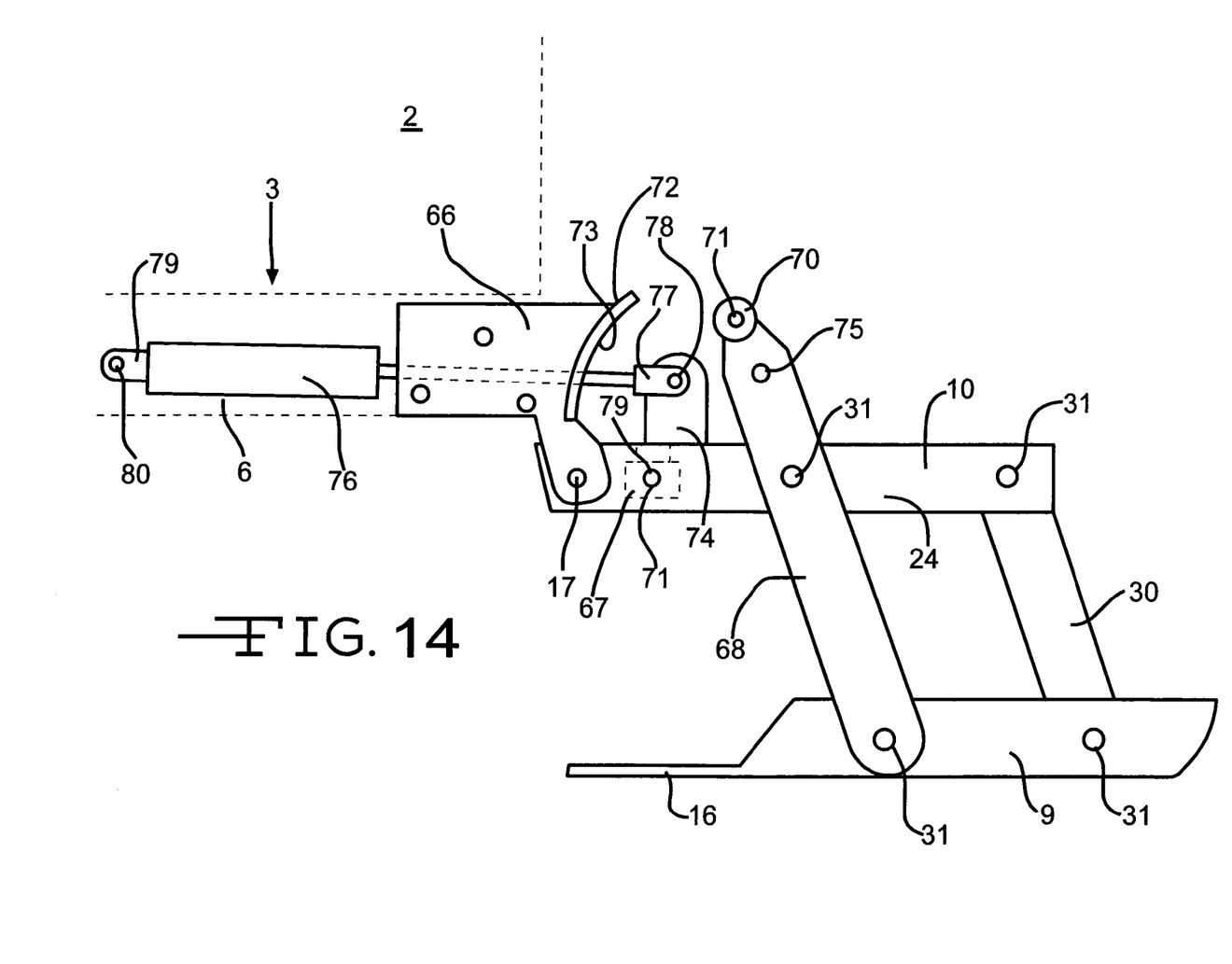
FIG. 14 is a side view of a similar tailgate assembly mounted as the tailgate assembly shown in FIG. 13.

In FIGS. 12–14 the tailgate assembly 64 is shown in the lowered and steps position. When in the up position the tailgate has the same or very similar appearance as that shown in FIGS. 3 and 5a except that the locking mechanism 12 would preferably be replaced with an electro-mechanical mechanism as described above. In operation, to lower the powered tailgate assembly 64, a tailgate-open switch in the cab, at the rear of the box 2 and/or in a remote device would be activated. In sequence the tailgate would be unlocked from the sides of the box 2, and fluid would be pumped to the hydraulic cylinder 76 causing the rod end 77 to push the lever arm 74 causing the lower portion 8 of the tailgate assembly 64 to pivot around pins or bolts 17 going into a lowered position, during this operation the cam follower 70 rolls along the cam surface 73 of the cam 72 causing the top portion 9 of the of the tailgate assembly 64, lower step, to separate from the lower portion 10, top step, forming the steps into the bed 3. When a raise tailgate switch is activated, the powered tailgate assembly 64 reverses this process as the cylinder 76 retracts the rod end 77 pulling and causing the lever arm 74 to pivot in an arc around pin 17 bringing the cam follower into contact with the upper part of the cam surface 73 of the cam 72. As the cylinder rod end 77 is further retracted, the cam follower 70 rolls along the cam surface 73 causing the top portion 9, lower step, to move into the raised tailgate position with the top surface 29 of the lower step being generally in the same plane as the top surface 28 of the upper step. As soon as the cylinder rod end 77 is fully retracted, the locks are activated to secure and lock the tailgate assembly 64 in the raised position.

The powered option is particularly desirable many because the tailgate assembly of the present invention is heavier than a normal tailgate and further because it will in many instances avoid the driver having to get out of the cab when picking up or delivering items to a person available to place the item(s) in the box or to remove items from the box. This is particularly helpful in bad weather or when due to a handicap or other condition it is unpleasant for the driver to get in and out of the cab.

FIG. 14 shows another optional feature, a different and simpler embodiment of the locking option shown in FIG. 11. In this optional embodiment the top portion 9 of the tailgate assembly 8 or 64 can be locked in the same plane with the lower portion 10 using an electrically activated solenoid mounted against the inside surface of each upper arm 24, i.e. inside the lower portion 10 and out of sight. A hole 71 in each of the upper arms 24 permits the solenoid shaft 79 located in the upper arm 24 to move out of hole 71 and into a hole 75 in each of the long links 68 that align with the hole 71 when the tailgate is in the raised position. as long as the solenoid shaft is in hole 75, the upper portion 9 of the tailgate assembly 8 or 64 will remain in alignment with the lower portion 10 even when the tailgate is lowered. Thus with electrical switches in the cab, remote and/or at the rear of the box, the driver can leave the solenoid 67 activated when he lowers the tailgate if he wants the tailgate to stay in the same plane forming a single step or acting as a normal tailgate, albeit at a lower elevation, instead of forming two steps. Later if he wants to form steps he can deactivate the solenoid 67. If the driver wants to lower the tailgate into steps from a raised position, he deactivates the solenoid 67 before lowering the tailgate. Preferably, the solenoid 67 automatically activates when the tailgate is locked into place in the raised position. These switches can be combined in a known manner to simplify the controls for the driver. This optional locking device using the solenoids 67 and holes 71 and 75 can be used on any of the tailgate assemblies disclosed except that shown in FIG. 11 and it can be in other locations along upper arms 24 or the lower arms 26. This same type of solenoid can be located inside the upper portion 9 to lock the tailgate in the raised position by causing the solenoid shafts to enter holes 15 in the sides 7 of the box 2.

Figure 15:
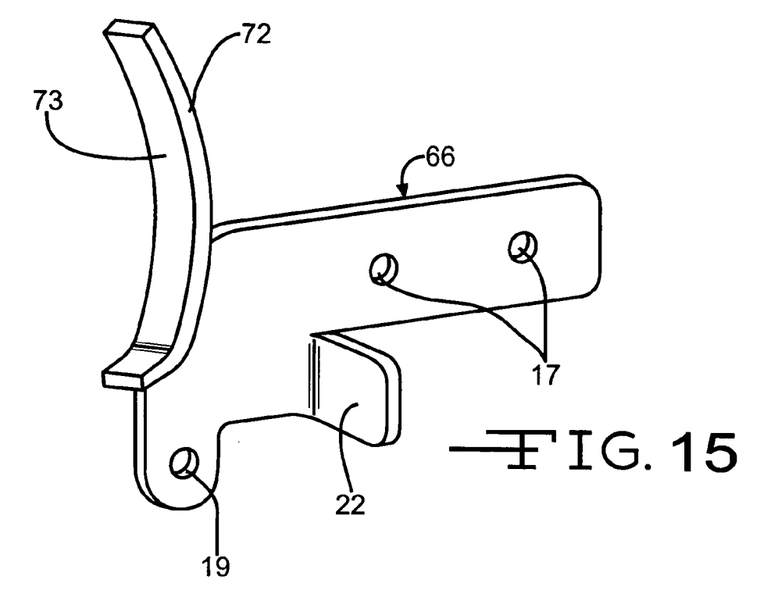
FIG. 15 is a perspective view of a left hand tailgate bracket for the tailgate assembly shown in FIGS. 12–14.
Figure 16:
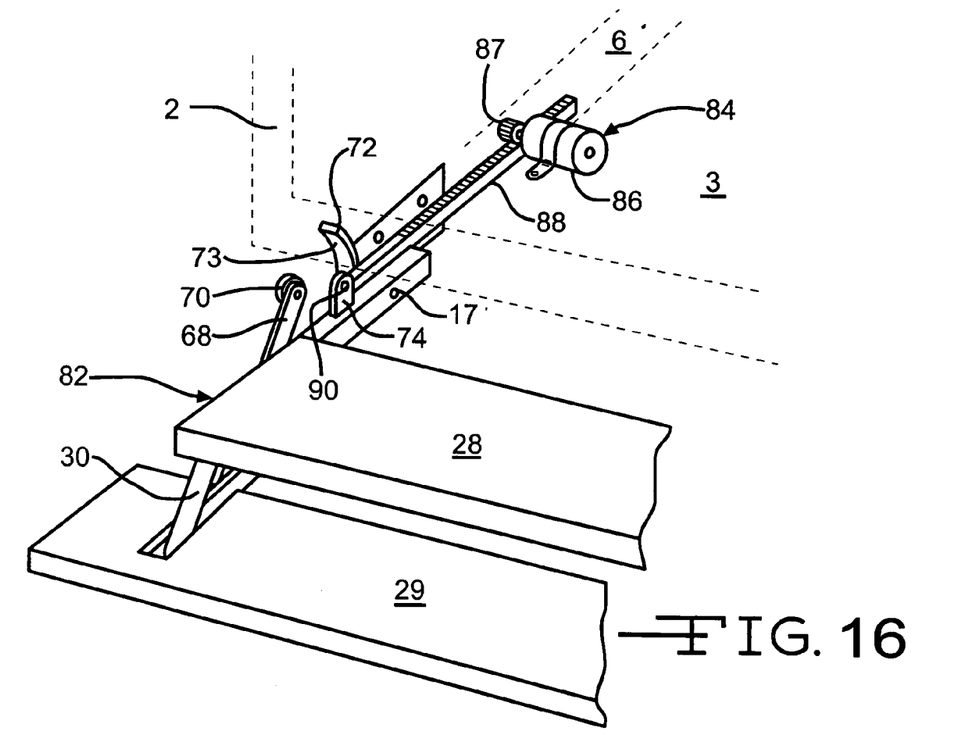
FIG. 16 is a partial perspective view of the left hand side of another embodiment of the invention that uses an optional electro-mechanical mechanism to raise and lower the tailgate assembly.

FIG. 16 shows another powered tailgate assembly 82. The elements of the assembly 82 are the same as the powered tailgate assembly 64 shown in FIGS. 12–15 except for the raising and lowering mechanism. In this embodiment an electro-mechanical mechanism 84 is used, either on only one side or on both sides. The electro-mechanical mechanism 84 shown is a rack and pinion type driven by a reversible electric motor 86 that can be mounted to the frame 6 or box 2 in any suitable manner. The motor 86 turns a pinion 87 having teeth that mesh with an elongated rack 88 which moves back and forth with respect to the location of the motor 86 and the tail end of the box 2. The rack 88 has and end portion 90 that rotatably mounts to the lever arm 74 with a pin or bolt in a similar manner as the cylinder rod end 77 mounts to the lever arm 74. One example of a suitable electro-mechanical mechanism to use is a McMaster-Carr 12 volt DC #6530K63 (tow piece). This embodiment operates in the same manner as the embodiment shown in FIGS. 12–14 and uses the same mounting bracket as shown in FIG. 15. This embodiment is preferred over that shown in FIGS. 12–14 because all electric is preferred over a combination of electric and pressurized fluid.

Given the above disclosure of the concept and the several embodiments and modifications, it will be obvious to the ordinary artisan that there are many additional modifications possible that are not described in detail and many other uses for this invention. Those obvious modifications, obvious embodiments and obvious uses are intended to be included in the scope reasonable interpretation of the following claims.

I claim:

1. A door/step assembly for a vehicle having a bed or floor, the assembly comprising a door/step for mounting onto the vehicle in a manner allowing the door/step to pivot to open from a closed position and to pivot to close from an opened position, the pivot location (17) being a few to several inches below the top surface of the bed or floor of the vehicle, the assembly comprised of at least one generally flat surface that, when the door/step is pivotly opened, provides one or more steps to enable a person to step onto the at least one generally flat surface and then onto the bed or floor, the door/step assembly further comprising a top portion and a lower portion, the at least one generally flat surface comprising one surface of the top portion and one surface of the lower portion, the top portion and lower portion being connected with spaced apart links making the assembly capable of separating such that the one surface of the top portion can become a top surface of a lower step that is spaced from and at a lower level than the one surface of the lower portion, that surface forming a top surface of an upper step, the links being so arranged that the one surface of the top portion and the one surface of the bottom portion remain parallel to one another during separation.

2. The assembly of claim 1 comprising one or more members within the door/step that support the one or more steps when the door/step is in an opened position.

3. The assembly of claim 2 that provides two steps, the assembly further comprising one or more brackets, the pivot location being in the one or more brackets that are pivotly connected to the one or more members in a lower portion of the door/step, the one or more brackets being fastened to either the frame of the vehicle or to the rear of the bed.

4. The door/step assembly of claim 3 wherein the top surface of the two steps is the surface exposed to the interior of a vehicle box when the door/step assembly is in the closed position, this exposed surface of the door/step being generally flat, and wherein an at least one mechanism for preventing the two portions from separating is located in at least one of the two portions.

5. The assembly of claim 3 further comprising a powered mechanism for lowering and raising the tailgate.

6. The assembly of claim 5 wherein the assembly comprises an upper portion and a lower portion and wherein the upper portion becomes the step at the lower elevation and the lower portion becomes the step at a higher elevation and further comprising at least one electrically activated mechanism for preventing the two portions from separating into the two steps until the mechanism is activated.

7. The assembly of claim 6 wherein the at least one mechanism for preventing the two portions from separating is located in at least one of the two portions.

8. The assembly of claim 2 wherein the door/step assembly is a tailgate assembly comprising a cover that is on the rear exterior of the vehicle when the tailgate assembly is in the closed position, the cover being a single piece.

9. The tailgate assembly of claim 8 wherein the appearance of the rear cover is substantially the same as the appearance of the original rear cover of the original tailgate.

10. The door/step assembly of claim 1 wherein the assembly further comprises one or more components for attaching a rear bumper such that the bumper can swing out of the way as the door/step is opened.

11. A tailgate assembly for a vehicle having a bed or floor, the tailgate assembly pivoting to open or close, the pivot location being a few to several inches below the top surface of the bed or floor, the tailgate assembly, comprised of at least two generally flat parts (28,29) that when the tailgate is opened separate and provide two steps to enable a person to step up onto one step and then to step up onto the bed or floor using another step, the two generally flat parts being connected with spaced apart links making the two generally flat parts capable of separating such that a top surface of one generally flat part and a top surface one surface of the other generally flat part remain parallel to one another during the separation.

12. The tailgate assembly of claim 11 comprising two or more members (24,26) within the tailgate assembly that support the one or more steps when the tailgate assembly is in a lowered position.

13. The tailgate assembly of claim 12 that provides two steps, one step being at a lower elevation than the other step and the tops of both steps being at a lower elevation than the top of the bed and the pivot location being in brackets that are pivotally connected to the members that are in a lower portion of the tailgate assembly, the brackets being fastened to either the frame of the vehicle or to the rear of the bed.

14. The tailgate assembly of claim 13 further comprising a mechanism for lowering and raising the tailgate.

15. The tailgate assembly of claim 14 wherein the tailgate comprises an upper portion and a lower portion and wherein the upper portion becomes the step at the lower elevation and the lower portion becomes the step at a higher elevation and further comprising at least one electrically activated mechanism for preventing the two portions from separating into the two steps until the mechanism is activated.

16. The tailgate assembly of claim 15 wherein the top surface of the two steps is the tailgate surface exposed to the interior of a vehicle box when the tailgate assembly is in the closed position, this exposed surface of the tailgate being generally flat, and wherein the at least one mechanism for preventing the two portions from separating is located in at least one of the two portions.

17. The tailgate assembly of claim 15 wherein the at least one mechanism for preventing the two portions from separating is located in at least one of the two portions.

18. The tailgate assembly of claim 12 wherein the tailgate assembly comprises a rear cover, the rear cover being a single piece.

19. The tailgate assembly of claim 18 wherein the appearance of the rear cover is substantially the same as the appearance of an original rear cover of an original tailgate.

20. The tailgate assembly of claim 11 wherein the assembly further comprises one or more components for attaching a rear bumper such that the bumper can swing out of the way as the tailgate is opened.

21. A tailgate assembly for a vehicle having a bed or floor, the assembly comprising a tailgate for mounting onto the vehicle and for allowing the tailgate to pivot from a closed position to an opened position and from an open position to a closed position, the tailgate comprising a member to mount onto the vehicle to provide a location of the pivot, the pivot location being at least a few inches below the top surface of the bed or floor of the vehicle, the assembly further comprising at least one generally flat part that when lowered provides one or more steps to enable a person to step onto the at least one generally flat part and then onto the bed or floor, the assembly also comprising at least one arm (24) comprising the pivot and also comprising mounts for a rear bumper for the vehicle.

22. A method of making a door/step assembly for a vehicle having a bed or a floor in such a way that the door/step pivots from locations in the door/step near a lower edge to open and close and from a location in one or more brackets that are made to fasten to a frame or the bed or floor of the vehicle, locating the one or more brackets such that when the door/step is opened, a generally flat top surface of the door/step, in the opened position is at an elevation at least a few to several inches below the top of the bed or floor, further making the door/step of the assembly to further comprise a top portion and a lower portion, the at least one generally flat surface comprising one surface of the top portion and one surface of the lower portion, linking the top portion and lower portion together with spaced apart pivoting links to make the door/step capable of separating such that the one surface of the top portion can become a top surface of a lower step that is spaced from and at a lower level than the one surface of the lower portion, that one surface forming a top surface of an upper step, the links being so arranged that the one surface of the top portion and the one surface of the bottom portion remain parallel to one another during separation.

23. The method of claim 22 wherein one or more components are added to the assembly for attaching a rear bumper to the door/step such that the bumper can swing out of the way as the door/step is opened.

24. The method of claim 22 wherein the pivoting links are concealed between the at least one generally flat surface and a cover for the door/step that is on the exterior of the vehicle when the door/step is in a closed position.

25. A door/step assembly for a vehicle having a bed or floor, the assembly comprising a door/step for mounting onto the vehicle in a manner allowing the door/step to pivot to open from a closed position and to pivot to close from an opened position, the pivot location (17) being a few to several inches below the top surface of the bed or floor of the vehicle, the assembly comprised of at least one generally flat surface that, when the door/step is opened, provides a generally flat surface at an elevation lower than the elevation of a top surface of the bed or floor, the generally flat surface being useful as a step to the bed or floor and for other things, the door/step comprising a top portion and a lower portion, the door/step being capable of separating to form a plurality of steps to enable a person to walk up onto the bed or floor, the door/step assembly further comprising one or more locking mechanisms for releasably locking the top portion to the lower portion, the top portion and the lower portion being connected with spaced apart links making the assembly capable of separating, when the one or more locking mechanisms are released, such that the top portion can form a lower step with a step surface and the lower portion can form an upper step with a step surface, the latter step surface being spaced from and at a higher elevation than the step surface of the lower step the links being arranged such that the step surface of the lower step and the step surface of the bottom portion remain parallel to one another during separation.

* * * * *